Aug. 14, 1951        J. B. PARSONS        2,564,444
CONTROL DEVICE FOR CONVERTIBLE TOPS
Filed Oct. 5, 1945
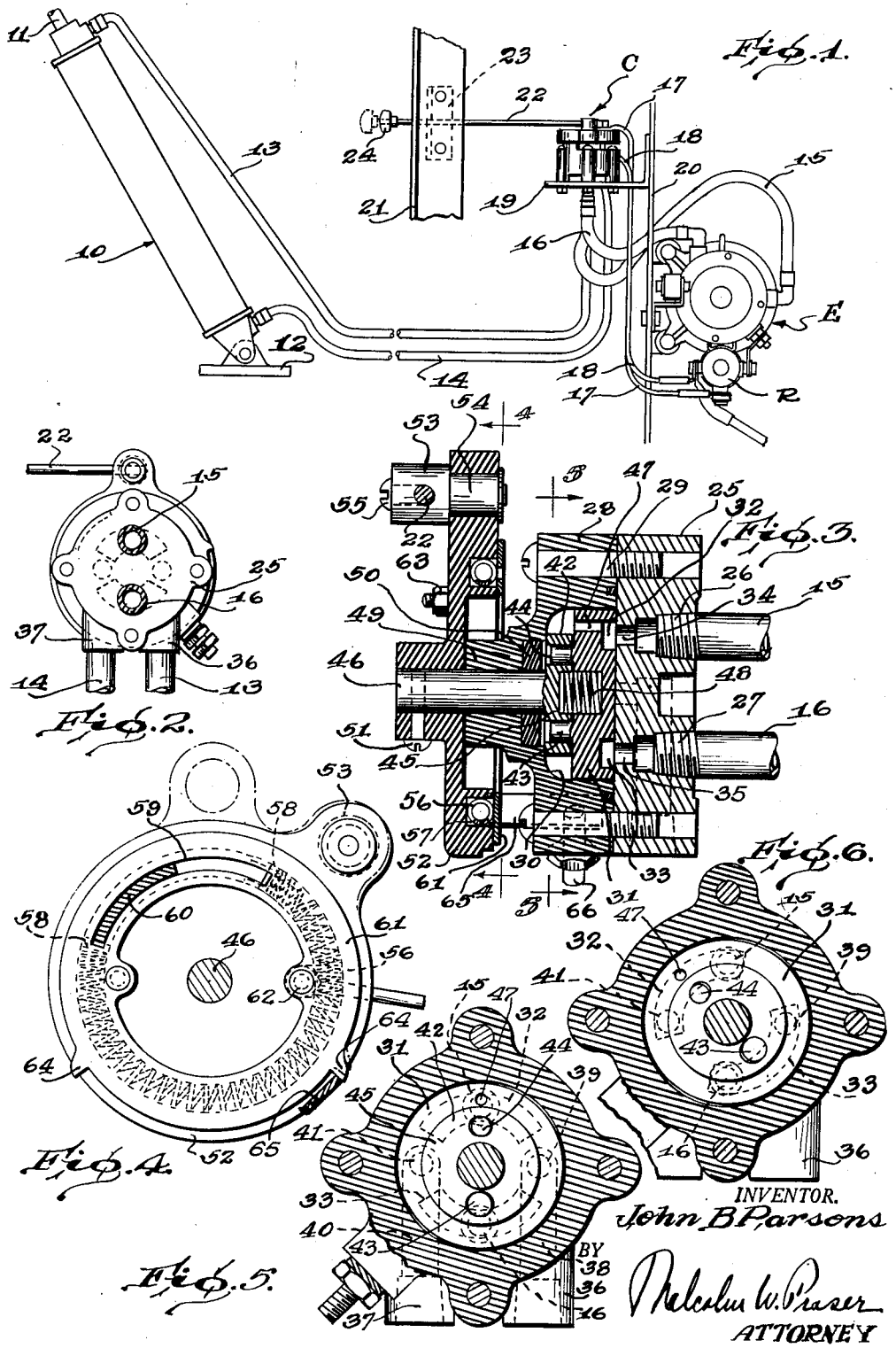
INVENTOR.
John B. Parsons
BY
Malcolm W. Fraser
ATTORNEY Patented Aug. 14, 1951

2,564,444

UNITED STATES PATENT OFFICE 2,564,444

CONTROL DEVICE FOR CONVERTIBLE TOPS

John B. Parsons, Toledo, Ohio

Application October 5, 1945, Serial No. 620,512

5 Claims. (Cl. 251—87)

1

This invention relates to control devices, but more particularly to a combined valve and switch mechanism adapted particularly for use in connection with hydraulic regulator mechanism usable, for example, in power actuation of folding tops for automobiles and other vehicles of the convertible type, and an object is to produce a simple and efficient control device of this character which is rugged in construction, reliable in operation, relatively easy to manufacture and assemble, and in which are embodied the new and improved features of construction, arrangement and operation hereinafter described.

For purposes of illustration but not of limitation, an embodiment of the invention is shown on the accompanying drawings in which Figure 1 is a fragmentary diagrammatic view showing a hydraulic piston and cylinder assembly adapted for vehicle top operation, the motor pump unit and the combined valve and switch mechanism with the manual control accessible to the instrument panel of the vehicle;

Figure 2 is a bottom plan view partly in section of the control device;

Figure 3 is an enlarged longitudinal sectional elevation of the control device;

Figure 4 is a transverse sectional view substantially on the line 4—4 of Figure 3 showing the operating member moved to one position of operation;

Figure 5 is a transverse sectional view substantially on the line 5—5 of Figure 3 with the valve member in its intermediate or neutral position; and Figure 6 is a transverse sectional view similar to Figure 5 but with the valve member in the position of adjustment corresponding to the position of the parts indicated on Figure 4.

The illustrated embodiment of the invention comprises a hydraulic regulator mechanism and its controls for use in connection with the raising and lowering of a folding top for a vehicle such as an automobile, the hydraulic piston and cylinder assembly being indicated at 10 having a cylinder in which is slidable the usual piston and from which extends a piston rod 11 adapted to be secured to the leverage system for the automobile top assembly. The lower end of the cylinder as indicated, is pivoted to a bracket 12 so that the assembly may rock during the raising and lowering movements of the top. The piston within the cylinder is moved in opposite directions by a liquid under pressure and for that purpose, a tube 13 leads to the upper end of the cylinder to enable the fluid under pressure to

2 force the piston downwardly and a tube 14 is connected to the lower end of the cylinder for enabling the piston to be forced upwardly. The tubes 13 and 14 lead to a control device C, the construction and operation of which will be hereinafter described.

Leading from the control device C are tubes 15 and 16 which extend to an electrically driven motor pump unit E which includes a pump adapted to force liquid from a suitable reservoir or source of supply through the tube 15 for actuating the piston of the hydraulic regulator 10 in one direction, liquid from the opposite end of the assembly returning to the reservoir through the tube 16. The electric motor is actuated through a suitable relay R from which leads 17 and 18 extend to the control device C as will be hereinafter described. Since the construction and operation of the motor pump unit E forms no part of the present invention, detail description and illustration thereof is not considered necessary, but reference is hereby made to my co-pending application Serial No. 452,865 filed July 30, 1942, now Patent Number 2,393,406, issued January 22, 1946, entitled Motor Pump Unit wherein the same is fully shown and described.

The control unit C in this instance is mounted in upright position upon a horizontal bracket 19 suitably secured to an upright 20 and it is disposed beneath the hood (not shown) of the vehicle and forwardly of the instrument panel 21. For actuating the control unit C, a rod 22 is slidable through the instrument panel 21, a bracket 23 supporting the same for sliding movement. On the outer end of the rod 22 is a knob 24 providing a handle for actuating the control rod.

The control unit C comprises a base 25 on the outer side of which are formed spaced screw-threaded openings 26, and 27 to screw-threadedly receive the adjacent ends of the tubes 15 and 16 which lead to the motor pump unit E. The base 25 may be formed by die casting, and abutting against the outer face thereof is a housing part 28 which is secured to the base 25 by screws 29. The housing part is formed with a central cavity 30 of substantially cup shape configuration and rotatable in the cavity 30 and arranged in face contact with the adjacent flat side of the base 25 is a rotary valve member 31. The valve member 31 is provided with a pair of arcuate grooves 32 and 33 which, as shown in Figure 3, are adapted to register with the ports 34 and 35 which respectively communicate with the tubes 15 and 16. The tube 13 leading from the top of the hydraulic cylinder 10 is connected to a boss 36 extending from the side of the base 25 and the tube 14 leading from the lower end of the hydraulic cylinder 10 is connected to a second boss 37 on the base 25. From the boss 36 extends a passage 38 which terminates in a port 39 and from the boss 37 extends a passage 40 which terminates in a port 41, both ports 39 and 41 extending to the inner face of the base 25 adjacent the face of the rotary valve member 31.

It will be observed that the arcuate grooves 32 and 33 in the neutral position of the valve member 31 as indicated on Figure 5, communicate only with the tubes 15 and 16 respectively so that no liquid is being forced by the motor pump unit E to the hydraulic cylinder 12. However, when the valve 31 is rotated so that the groove 33 bridges the tube 16 and port 39 and the groove 32 bridges the tube 15 and port 41, thereupon liquid from the motor pump unit E passes from the tube 15 to the port 41 and thence through the tube 14 to the bottom side of the hydraulic cylinder 10, forcing the piston therein outwardly of the cylinder. At the same time, liquid on top of the piston is returned through the tube 13, through the passage 38, port 39, arcuate valve passage 33 to the tube 16 and thence back to the motor pump unit E. In this manner the foldable top, for example, of the vehicle may be moved to its raised position. Similarly, it will be manifest that by moving the valve member 31 to such position that the tube 15 and port 39 are bridged so that liquid is forced from the motor pump unit E through the tube to the top of the hydraulic cylinder 10 to force the piston therein downwardly, the top, for example, would be actuated to its lowered or folded position. At such time, the port 41 and tube 16 are brought into communication to allow liquid from the under side of the piston to return through the tube 14 and then the tube 16 to the motor pump unit E.

It will be understood that the housing 28 as well as the valve 31 are of insulating material such as Bakelite. The valve member 31 is formed with a boss 42 on the outer side thereof and formed therein are a pair of diametrically opposed pins 43 which are annular in cross section and are slightly smaller than sockets 44 formed in a head 45 integral with an operating stem 46. The loose fit between the pins 43 and the sockets 44 is shown on Figures 5 and 6 and enables the slight lost motion between these parts for a purpose which will hereinafter be described.

The rotary valve disc 31 is securely held against the base 25 when liquid under pressure is introduced thereto by a passage 47 which leads from the arcuate groove 32 to the opposite face of the valve disc and to the chamber 30. This enables liquid under pressure to pass therethrough and impose a substantial pressure against the valve disc urging it against the base 25 and effectively and simply form a fluid-tight seal therebetween. A coil spring 48 which is socketed respectively in the rotary valve disc 31 and the actuating head 45 normally urges the valve disc against the base 25 but not with sufficient pressure to interfere with the turning movement thereof nor to effect the desired liquid seal.

The housing 28 is formed with an upwardly projecting integral boss 49 which forms a bearing for the operating stem 46. The inner portion of the boss is socketed to receive a resilient packing 50 to provide a seal and prevent the leakage of liquid along the stem. Secured to the outer end portion of the stem 46 by a set screw 51 is an operating disc or cap 52 of electrical insulating material. A rotatable sleeve 53 is mounted on a pin 54 carried by an edge portion of the disc 52 and the sleeve is apertured to receive the end portion of the rod 22, a set screw 55 retaining the rod in position.

The control disc 52 is normally retained in a predetermined position by a coil spring 56 which is disposed in an arcuate recess 57 on the under side of the disc. The ends of the spring 56 abut against shoulders 58 and are spaced from each other substantially as shown in Figure 4. Joining the spaced-apart ends of the arcuate recess is a relatively narrow arcuate recess 59 into which fits an arcuate post-like member 60 which is fixed at its lower end to the housing 28. The post-like member 60 normally occupies the relatively narrow arcuate recess 59 and is of such width as substantially to fill the recess 59. Thus when the operating disc 52 is turned in one direction or the other, the coil spring 56 is compressed so that when the disc is released, it will return to its normal intermediate position. Fitting against the under side of the operating disc 52 is a metallic conducting ring 61 which is secured in place by rivets 62. Electrical current is supplied to the ring 61 from a binding post 63 which forms a part of one of the rivets 62. Projecting from the periphery of the ring 61 are a pair of lugs or tabs 64 which are spaced from each other and are adapted selectively to contact an electrical contact post 65 when the operating disc 52 is rocked in one direction or the other. Figure 4 shows the right-hand tab 64 brought into contact with one side of the contact post 65 but it will be understood that by rocking the operating disc 52 in the opposite direction, the other tab may be brought into contact with the other edge portion of the contact post 65. Current is supplied to the contact post 65 from a binding post 66.

The leads 17 and 18 above mentioned may be connected respectively to the binding posts 66 and 63. It is believed that the description of the system above given will be readily understood in that by operating the knob 24, the operating disc or cap 52 is rocked in one direction or the other, and in either direction of operation, the motor pump unit E is energized as soon as one or the other of the tabs 64 is brought into contact with the contact post 65, thereby establishing the electrical circuit and according to the position of the rotary valve member 31, liquid will be forced under pressure to one side or the other of the top operating cylinder—piston assembly 10. The slight lost motion afforded by the pins 43 and their socket 44 is such as to enable the electric circuit to be established or broken slightly before rotary motion is imparted to the valve disc. Thus the circuit can be broken slightly before the disc is turned so that the pressure is sufficiently relieved to enable free turning of the disc valve 31.

It will be manifest that I have produced an exceedingly simple and efficient control unit whereby not only the motor pump unit can be operated, but also the direction of liquid flow can be readily controlled. The number of parts has been reduced to a minimum so as to militate against excessive cost and production difficulties. The automatic hydraulic sealing feature obviates the necessity of costly backings and affords a very simple and satisfactory means of establishing a fluid-tight seal.

It is to be understood that numerous changes

What I claim is:

1. A control device for hydraulic regulators comprising an assembly having a base with a pair of pressure fluid inlet and a pair of pressure fluid outlet ducts, said base having a flat valve engaging surface, a valve member oscillatable relative to said base and having a surface engaging said flat base surface, the base engaging surface of said valve member having a pair of arcuate cavities therein selectively to establish communication between an inlet duct of one pair and an outlet duct of the other pair, a housing for said valve member rigidly secured to the base, said housing having a recess adjacent the face of the valve member opposite said base, said valve member having a port extending through one cavity thereof enabling pressure fluid to pass to said recess, thereby to urge said valve intimately into engagement with said base surface, a shaft for actuating said valve in said housing, an actuator for said shaft having an annular recess in the inner face thereof, a helical coil spring in said recess, a plate covering said recess to retain said spring in place and having an arcuate slot, an arcuate post on said housing extending into said slot and disposed between the ends of said spring, a second post projecting from said housing toward said plate, and stops on said plate engageable by said second post for limiting the oscillatory movement of said actuator.

2. A control device for hydraulic regulators comprising an assembly having a base with a pair of pressure fluid inlet and a pair of pressure fluid outlet ducts, said base having a flat valve engaging surface, a valve member oscillatable relative to said base and having a surface engaging said flat base surface, the base engaging surface of said valve member having a pair of arcuate cavities therein selectively to establish communication between an inlet duct of one pair and an outlet duct of the other pair, a housing for said valve member rigidly secured to the base, said housing having a recess adjacent the face of the valve member opposite said base, said valve member having a port extending through one cavity thereof enabling pressure fluid to pass to said recess, thereby to urge said valve intimately into engagement with said base surface, a shaft for actuating said valve in said housing, a lost motion connection between said shaft and valve, an actuator for said shaft having an annular recess in the inner face thereof, a helical coil spring in said recess, a plate covering said recess to retain said spring in place and having an arcuate slot, an arcuate post on said housing extending into said slot and disposed between the ends of said spring, a second post projecting from said housing toward said plate, and stops on said plate engageable by said second post for limiting the oscillatory movement of said actuator.

3. A control device for hydraulic regulators comprising an assembly having a base with a pair of pressure fluid inlet and a pair of pressure fluid outlet ducts, said base having a flat valve engaging surface, a valve member oscillatable relative to said base and having a surface engaging said flat base surface, the base engaging surface of said valve member having a pair of arcuate cavities therein selectively to establish communication between an inlet duct of one pair and an outlet duct of the other pair, a housing for said valve member rigidly secured to the base, said housing having a recess adjacent the face of the valve member opposite said base, said valve member having a port extending through one cavity thereof enabling pressure fluid to pass to said recess, thereby to urge said valve intimately into engagement with said base surface, spring means for urging the valve against said base surface, a shaft for actuating said valve in said housing, an actuator for said shaft having an annular recess in the inner face thereof, a helical coil spring in said recess, a plate covering said recess to retain said spring in place and having an arcuate slot, an arcuate post on said housing extending into said slot and disposed between the ends of said spring, a second post projecting from said housing toward said plate, and stops on said plate engageable by said second post for limiting the oscillatory movement of said actuator.

4. In a control device for hydraulic regulators, an oscillatable valve member, a housing for said valve member, a shaft for actuating said valve in said housing, an actuator for said shaft having an annular recess in the inner face thereof, a helical coil spring in said recess, a plate covering said recess to retain said spring in place and having an arcuate slot, an arcuate post on said housing extending into said slot and disposed between the ends of said spring, a second post projecting from said housing toward said plate, and stops on said plate engageable by said second post for limiting the oscillatory movement of said actuator.

5. In a control device for hydraulic regulators, an oscillatable valve member, a housing for said valve member, a shaft for actuating said valve in said housing, a lost motion connection between said shaft and valve, an actuator for said shaft having an annular recess in the inner face thereof, a helical coil spring in said recess, a plate covering said recess to retain said spring in place and having an arcuate slot, an arcuate post on said housing extending into said slot and disposed between the ends of said spring, a second post projecting from said housing toward said plate, and stops on said plate engageable by said second post for limiting the oscillatory movement of said actuator.

JOHN B. PARSONS.

REFERENCES CITED

The following references are of record in the file of this patent:

UNITED STATES PATENTS

| Number | Name | Date |
| --- | --- | --- |
| 731,375 | Liggett | June 16, 1903 |
| 897,198 | Donnersberg | Aug. 25, 1908 |
| 961,466 | Shade | June 14, 1910 |
| 1,382,412 | Campbell | June 21, 1921 |
| 1,711,565 | Hatfield et al. | May 7, 1929 |
| 1,831,187 | Mohr | Nov. 10, 1931 |
| 1,850,966 | Harris | Mar. 22, 1932 |
| 2,112,466 | Maloon | Mar. 29, 1938 |
| 2,115,950 | Gurries | May 3, 1938 |
| 2,153,559 | Hendricks | Apr. 11, 1939 |
| 2,233,192 | Armington | Feb. 25, 1941 |
| 2,233,944 | Genda | Mar. 4, 1941 |
| 2,451,706 | Aimes | Oct. 19, 1948 |

FOREIGN PATENTS

| Number | Country | Date |
| --- | --- | --- |
| 11,969 | Great Britain | of 1907 |